United States Patent
Arai et al.

[19]

[11] Patent Number: 6,051,951
[45] Date of Patent: Apr. 18, 2000

[54] GENERATOR MOTOR FOR INTERNAL COMBUSTION ENGINE

[75] Inventors: Hideaki Arai; Kazuyuki Kubo; Takuya Fujita, all of Saitama, Japan

[73] Assignee: Honda Giken Kogyo Kabushiki Kaisha, Tokyo, Japan

[21] Appl. No.: 09/155,151

[22] PCT Filed: Feb. 20, 1998

[86] PCT No.: PCT/JP98/00706

§ 371 Date: Sep. 22, 1998

§ 102(e) Date: Sep. 22, 1998

[87] PCT Pub. No.: WO98/36930

PCT Pub. Date: Aug. 27, 1998

[30] Foreign Application Priority Data

Feb. 20, 1997 [JP] Japan .................................. 9-052362

[51] Int. Cl.7 .................................................. H02P 1/46
[52] U.S. Cl. ........................ 318/700; 318/139; 318/145; 318/151; 180/65.1
[58] Field of Search .................................. 318/700, 139, 318/146, 151; 180/65.1; 123/192.1

[56] References Cited

U.S. PATENT DOCUMENTS 5,415,139  5/1995  Aoto et al. ............................... 318/139
5,497,741  3/1996  Tashiro et al. .......................... 318/139
5,789,881  8/1998  Egami et al. ............................ 318/139

FOREIGN PATENT DOCUMENTS

3-141819    6/1991   Japan .
4-355604   12/1992   Japan .
7-123512    5/1995   Japan .
7-222497    8/1995   Japan .
8-100689    4/1996   Japan .
8-116699    5/1996   Japan .
7-298696   11/1998   Japan .

*Primary Examiner*—Karen Masih
*Attorney, Agent, or Firm*—Armstrong, Westerman, Hattori, McLeland & Naughton

[57] ABSTRACT

An alternator for an engine normally operated as a generator is caused to operate as a synchronous motor according to the operating condition of the engine. If power generation by the alternator 1 is no longer necessary because a battery 9 is fully charged, or when the engine enters an acceleration condition, a switching controller 5 switches stator coils 12 for the alternator 1 from an output controller 7 to a rotating magnetic field generator 8. The rotating magnetic field generator 8 causes a stator 1S to generate a rotating magnetic field that rotates with a same rotation speed of a rotor 1R, so that the alternator 1 operates as a synchronous motor to generate such a torque 50 as to assist the torque or rotation of the engine. If the engine speed is likely to exceed a maximum limit, or when the engine enters a deceleration condition, the stator is caused to generate a rotating magnetic field with a phase angle relative to a direct-current magnetic field of the rotor so that the alternator generates such a torque as to suppress the engine speed.

16 Claims, 8 Drawing Sheets

GENERATOR MOTOR FOR INTERNAL COMBUSTION ENGINE

BACKGROUND OF THE INVENTION

1. Field of the Invention

This invention relates to a generator-motor for internal combustion engines, which operates not only as a generator for converting energy of rotation of an internal combustion engine into electric energy, but also as a motor for generating such a torque as to assist or suppress the torque generated by the internal combustion engine.

2. Description of the Related Art

Figure 2:
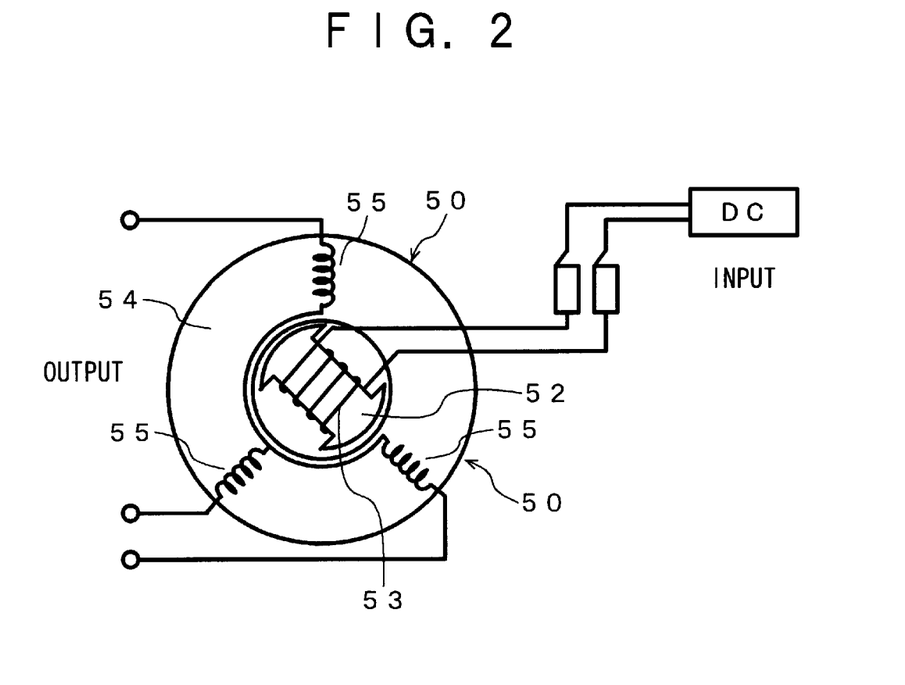
FIG. 2 is a diagram showing the structure of the main part of a conventional alternator.

A typical generator for internal combustion engines mounted on vehicles or ships includes an alternator (ACG) with its rotating shaft mechanically coupled to a crank shaft of an internal combustion engine (generally, through an alternator belt); a rectifier for converting AC power into DC power, the AC power generated by the alternator according to the rotating speed of the internal combustion engine; and a regulator for controlling the voltage level of the DC power according to the voltage across a battery. FIG. 2 is a schematic diagram showing a structure of a conventional alternator 50, in which a DC field coil 53 is wound around a rotor 52 integrally formed with the rotating shaft and a three-phase coil 55 is wound around a stator 54. Whenever the DC field coil 53 is excited by supplying direct current from the battery (not shown), the rotor 52 is rotated to create an alternating magnetic field. Consequently, the three-phase coil 55 of the stator 54 generates AC power with a frequency corresponding to the rotation speed of the rotor 52. In some cases, the rotor 52 may be provided with a permanent magnet instead of the DC field coil 53.

With such an internal combustion engine for vehicles or the like, since the rotor 52 of the alternator 50 is mechanically coupled to the crankshaft of the internal combustion engine even when the battery is fully charged and power generation is no longer necessary, the rotor 52 is rotated constantly to cause rotation loss due to belt driving torque or cooling fan resistance.

SUMMARY OF THE INVENTION

The present invention has been made by taking into account that such a conventional alternator is a generator with a construction of synchronous motor type, and a object thereof is to provide a generator-motor for internal combustion engines, which operates not only as a generator but also as a motor without any distinct change in structure of the conventional alternator.

The present invention is characterized in that the generator-motor for internal combustion engines comprising an alternator which includes a stator having multi-phase windings and a rotor having direct-current magnetic field generation means, which rotor is mechanically coupled to a rotating shaft of an internal combustion engine; output control means converting an alternating current generated in the multi-phase windings into direct current when said alternator is in the generator mode, which alternating current is induced by the rotation of said rotor resulting from the rotation of the internal combustion engine; rotating magnetic field generation means generating alternating current to be supplied to the multi-phase windings for generating a rotating magnetic field which causes said alternator to operate in the motor mode; switching means for selectively connecting the multi-phase windings of said stator to either said output control means or said rotating magnetic field generation means.

The rotating magnetic field generation means of the present invention is actuated according to the operating condition of the internal combustion engine in the following manners.

(1) The rotating magnetic field generation means generates a rotating magnetic field which causes the alternator (in the motor mode) to produce a torque assisting or suppressing the rotation of the internal combustion engine so that fluctuations in rotation of the internal combustion engine is absorbed and a deviation of the engine rotation with respect to a target value decreases at the time of idling or the like.

(2) The rotating magnetic field generation means generates in the stator such a rotating magnetic field as to cause the alternator (in the motor mode) to produce a torque assisting the rotation of the internal combustion engine when:

(a) power generation is no longer necessary;
(b) the internal combustion engine is started; and
(c) the vehicle or the like with the internal combustion engine mounted thereon is in an acceleration condition.

(3) The rotating magnetic field generation means generates in the stator such a rotating magnetic field as to cause the alternator (in the motor mode) to produce a torque suppressing the rotation of the internal combustion engine when:

(a) the vehicle or the like with the internal combustion engine mounted thereon is in a braking condition;
(b) driving wheels of the vehicle is in wheel spin (slipping) condition;
(c) the rotating speed of the internal combustion engine is likely to exceed an upper limit; and
(d) the vehicle speed is likely to exceed an upper limit.

According to the present invention, the generator of the internal combustion engine is capable of operating as a motor without any distinct change in the structure so that the rotation of the internal combustion engine is assisted or suppressed according to the operating condition of the internal combustion engine.

According to the feature (1) mentioned above, fluctuations in the engine speed that likely happens at the time of idling is prevented for stable operation of the internal combustion engine.

The feature (2) makes it possible: (a) to cancel the rotation loss due to the belt driving torque or cooling fan resistance, and hence improve efficiency of the internal combustion engine; (b) to assist the cel-motor (starting motor) with the torque, and hence allow miniaturization of the cel-motor, and quick and secure startup operation of the internal combustion engine; and (c) to improve acceleration performance of the engine.

The feature (3) makes it possible: (a) to improve braking performance of the engine; (b) to carry out traction control in improved response; (c) to prevent over revolution of the internal combustion engine, and (d) to improve its overspeed limiting function.

DETAILED DESCRIPTION OF THE PREFERRED EMBODIMENTS

Figure 1:
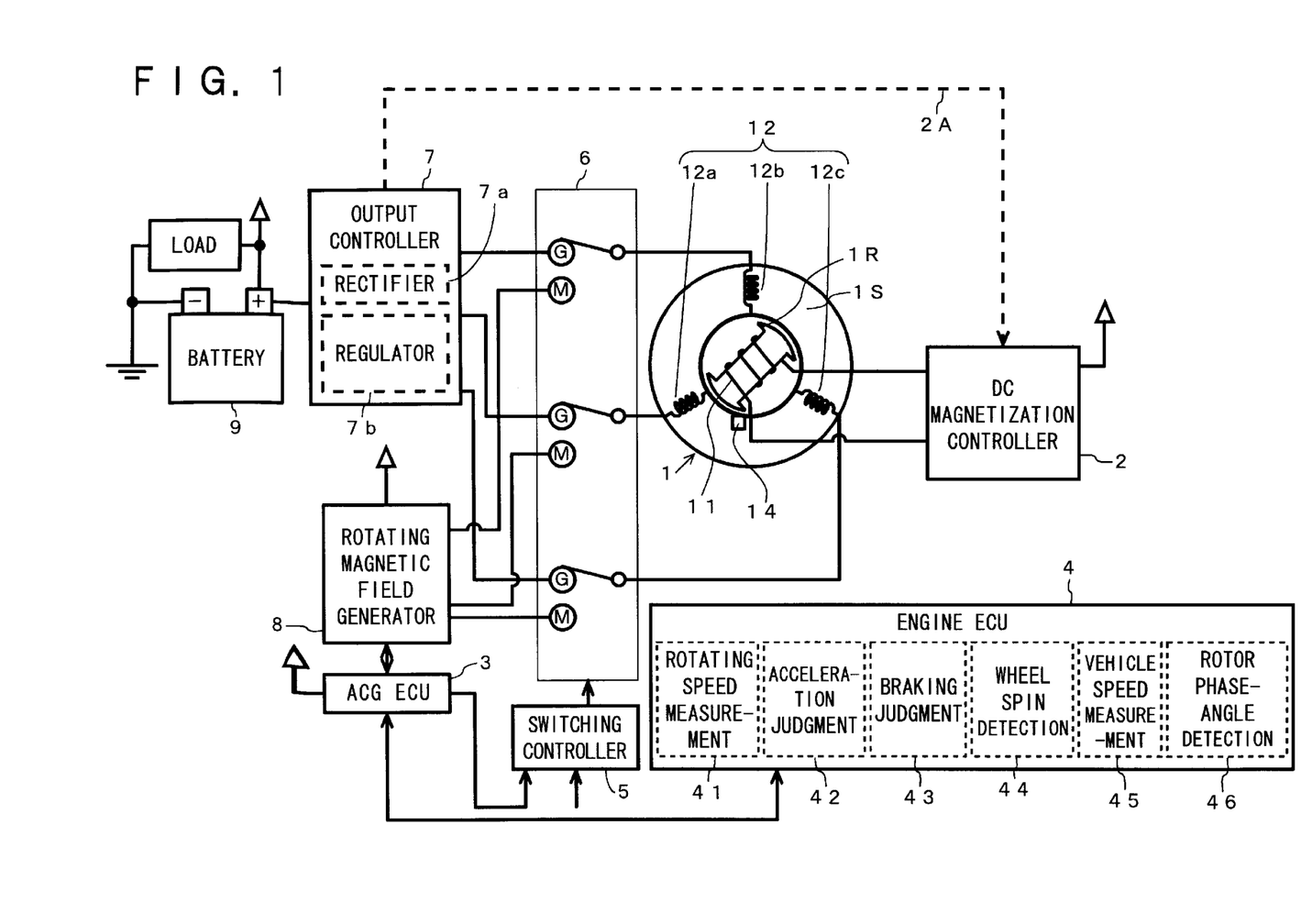
FIG. 1 is a block diagram of a generator-motor for vehicles according to an embodiment of the present invention.

Referring to the drawings, the present invention will be described below in detail. FIG. 1 is a block diagram showing a generator-motor for vehicles according to an embodiment of the present invention, in which a vehicle generator is designed to operate not only as a generator but also as a motor. A rotor 1R of an alternator 1 is provided with a DC magnetic field coil 11, and a stator 1S is provided with a three-phase winding, or three-phase stator coils 12 (12a, 12b and 12c). The rotor 1R is coupled to an engine crank shaft through a belt (both not shown).

A DC magnetization control unit 2 supplies direct current from a battery 9 to the DC magnetic field coil 11 to cause the rotor 1R to generate a DC magnetic field. In a generator mode, where the alternator 1 acts as a generator, the alternator 1 may also supply a part of its output current through the DC magnetization control unit 2 to the rotor coil 11 for self-magnetization, as shown by a dotted line 2A. An output controller 7 is provided with conventional rectifier circuit 7a and regulator 7b for regulating the output voltage, which is operative to convert alternating current, that is induced in the three-phase coils 12 of the stator 1S, into direct current voltage corresponding to that across the battery 9.

An engine ECU 4 includes a rotating speed measurement part 41, an acceleration judgment part 42, a braking judgment part 43, a wheel spin detection part 44, a vehicle speed measurement part 45 and a rotor phase-angle detection part 46. The engine ECU 4 also includes other functions for detecting an engine negative pressure Pb, a throttle position θth, an electrical load a, and the like. The rotor phase angle is detected, for example, by arranging a Hall element 14 or a pick-up coil opposite to the rotor 1R, or arranging a magnet and a Hall element (or pick-up coil) in positions along a rotating axis of the rotor and opposite to the rotating axis, respectively.

In a motor mode, where the alternator 1 acts as a synchronous motor, rotating magnetic field decision means, or an ACG/ECU 3, which causes the stator 1S to generate a rotating magnetic field, communicates with the engine ECU 4 to receive data such as an engine speed Ne, a battery voltage Eb, an electrical load a, and the like. Upon receipt of such data, the ACG/ECU 3 decides a speed of the rotating magnetic field in the stator 1S (equal to a rotating speed N0 of the rotor), a frequency f and a voltage V of the direct current supplied to the stator coils 12 (i. e., amplitude of the rotating magnetic field), a phase angle δ of the rotating magnetic field to the direct-current magnetic field of the rotor 1R, and the like, all required for generation of a torque desirable to assist or suppress the rotation of the engine, based on the received data in a manner described later. Then, the ACG/ECU 3 notifies a rotating magnetic field generator 8 of the decided factors.

In the motor mode, the rotating magnetic field generator 8 controls the amplitude and frequency of the AC current supplied to the respective field coils 12a, 12b and 12c of the stator 1S, based on the data from the ACG/ECU 3 such as the speed (RPM) and the phase angle of the rotating magnetic field, to generate a desired rotating magnetic field in a manner described later. A switching controller 5 controls a switch circuit 6 in accordance with instructions separately input from the ACG/ECU 3 such that the respective coils 12a, 12b and 12c of the stator 1S are connected, as shown, to respective input contacts G of the output controller 7 in the generator mode, and to respective output contacts M of the rotating magnetic field generator 8 in the motor mode.

When the rotor 1R generating a direct-current magnetic field is rotated in proportion to the rotation speed of the engine (not shown), an alternating-current electromotive force is induced in each of the stator coils 12. In the generator mode that requires power generation by the alternator 1, since the stator coils 12 are connected to the output controller 7 through the respective contacts G of the switch circuit 6, the alternating current generated in the stator coils is converted into direct current in the output controller 7 for supply to the battery 9 and an electrical load 30.

On the other hand, in the motor mode, the rotor coil 11 remains supplied with the direct current in the same manner as in the generator mode, while the stator coils 12 are switched to the output contacts M and supplied with alternating current at a proper frequency from the rotating magnetic field generator 8. This causes a rotating magnetic field in the stator 1S to allow the alternator 1 to act as a synchronous motor.

When the battery 9 is in a predetermined charged state (e.g., a full charged state or a charged state a little less than the full charged state in view of overcharge) and power generation by the alternator 1 is no longer necessary, the switching controller 5 is notified from the ACG/ECU 3 to switch over the connection from the contacts G to those M so as to connect the stator coils 12 to the rotating magnetic field generator 8. At this time, if the rotor coil 11 is subjected to self-magnetization as shown by the dotted line 2A, it should be noted that it must be switched to be magnetized by the battery 9. Such a switching circuit is obvious to those skilled in the art, and is not shown here for avoiding complication of the drawing.

The rotating magnetic field generator 8 supplies the AC current to the stator coils 12 at such a frequency f as to induce in the stator 1S a rotating magnetic field with a rotating speed equal to the rotating speed N0 of the rotor 1R, thereby actuating the alternator 1 in the motor mode. Thus, the alternator 1 operates as a synchronous motor and rotate at the rotating speed N0 in such a direction that the rotation of the rotor 1R assists the engine torque. In this case, if the phase angle of the rotor 1R with respect to the phase of the rotating magnetic field in the stator 1S is so set that the torque generated by the alternator 1 in the motor mode compensates for the rotation loss due to the belt driving torque and cooling fan resistance, it is possible to substantially cancel the rotation loss, and hence improve engine efficiency. The magnitude and frequency of the excitation voltage and the phase angle are decided in a manner described later.

Figure 3:
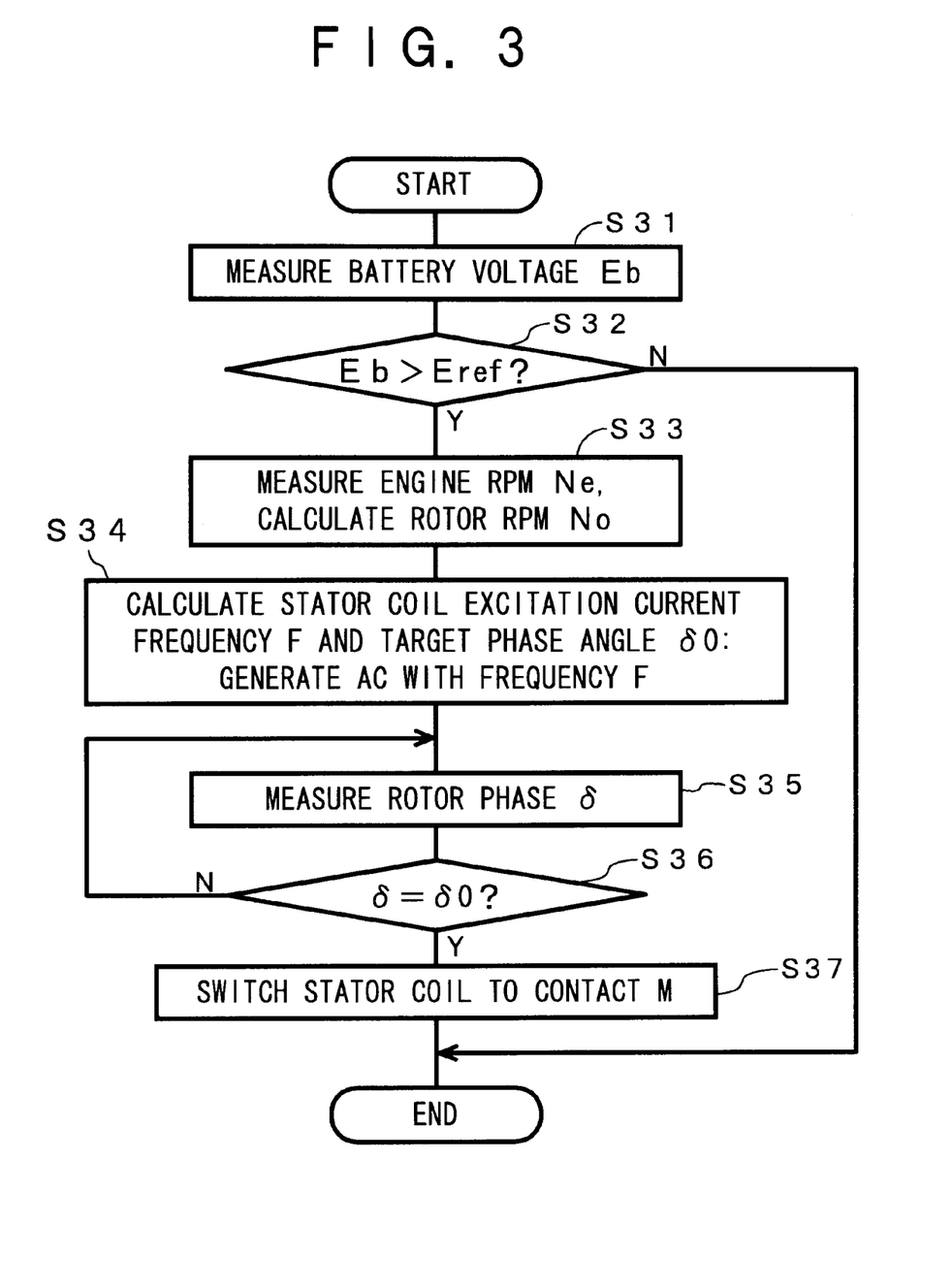
FIG. 3 is a flowchart showing operation according to the embodiment of the present invention.

FIG. 3 is a flowchart showing the control process according to an embodiment of the present invention. In step S31, a voltage Eb at the terminal of the battery 9 is measured. The measured battery voltage Eb is compared with a reference voltage Eref (e. g., 13.5 volts) in step S32. If the battery voltage Eb exceeds the reference voltage Vref, the battery is judged being charged enough to eliminate power generation by the alternator 1, and the procedure advances to step S33. If the battery voltage Eb is equal to or less than the reference voltage Vref, this process is halted.

In step S33, an engine speed Ne measured by the rotating speed measurement part 41 of the ECU 4 is read, and a current rotating speed N0 of the rotor 1R is calculated on the basis of the engine speed Ne and a pulley ratio which is known. In step S34, a frequency f of excitation current to be supplied to the stator coils 12 is calculated from the equation:

$$f = P \cdot N0/120,$$

where P is the Pole number of the stator coils 12, so that a rotating magnetic field with the rotating speed N0 is induced in the stator 1S, and hence the alternator 1 is actuated as a synchronous motor. Thus, the rotating magnetic field generator 8 generates alternating current at the frequency thus calculated. Further, in step S34, a target phase angle δ0 necessary to generate a desired strength of torque is calculated accordingly from an equation described later.

As well known, a torque T generated by the alternator 1 in the synchronous motor mode is a function of phase angle (phase shift angle) of the rotating magnetic field in the stator 1S to a direct-current magnetic field of the rotor coil 11, and magnitude of excitation voltage and/or current, which is represented by the equation:

$$T = (V/k \cdot N0) \sin \delta,$$

where V is a voltage of the excitation current and k is a constant. When the rotating magnetic field shows a leading phase to the direct-current magnetic field (i.e., the phase angle is positive), such a torque as to assist the rotation of the engine is generated; while when it is a lagging phase (i.e., the phase angle is negative), such a torque as to suppress the rotation of the engine is generated. In the embodiment of FIG. 3, since the rotation of the engine is to be assisted, the rotating magnetic field must be in a leading phase. The magnitude of the target phase angle δ0 is determined from the above relation by the following equation, $$\delta 0 = \text{Arc Sin}\ (k \cdot T \cdot N0/V).$$

In step S35, the phase angle δ of the direct-current magnetic field generated in the rotor 1R is measured by the rotor phase-angle detection part 46, for example, based on the output of the Hall element 14 and the rotating speed N0 of the rotor. In step S36, determination is made as to whether the measured phase angle δ becomes equal to the target phase angle δ0 adapted to generation of a desired torque. If the determination is affirmative, the procedure advances to step S37 in which the switching controller 5 is driven to switch over the stator coils 12a to 12c onto the contact M side. This causes the stator 1S to generate a rotating magnetic field at the rotating speed N0 and the target phase angle δ0 with respect to the direct-current magnetic field of the rotor, and hence the rotor produces a desired engine assisting torque.

According to the present embodiment, the alternator 1 produces the torque that compensates for and hence cancels rotation loss due to belt diving torque and/or cooling fan resistance, thereby improving efficiency of the internal combustion engine.

Although in the above embodiment the charged amount in the battery is represented by the voltage at the terminal of the battery, other known techniques can be adopted instead. For example, the detection of the charged amount can be achieved based on the change in specific gravity of electrolyte in the battery, or history information on charged and discharged amounts. In the case that the history information on the charged and discharged amounts is used for the detection, a current amount of charge can be obtained by detecting the charging and discharging current and accumulating the charged and discharged amounts sequentially on the initial amount. Then, when the current amount of charge thus calculated is comparable to the initial amount of charge or the full charged amount, the determination at step S32 is affirmative.

The alternator 1 can be set in the motor mode for other needs than the time when power generation is unnecessary. For example, it is effective in starting the engine with energizing the cel-motor or starting motor. In such a case, the alternator 1 helps the cel-motor with the assisting torque. This makes it possible to achieve miniaturization of the cel-motor, and start the engine quickly and surely.

Figure 4:
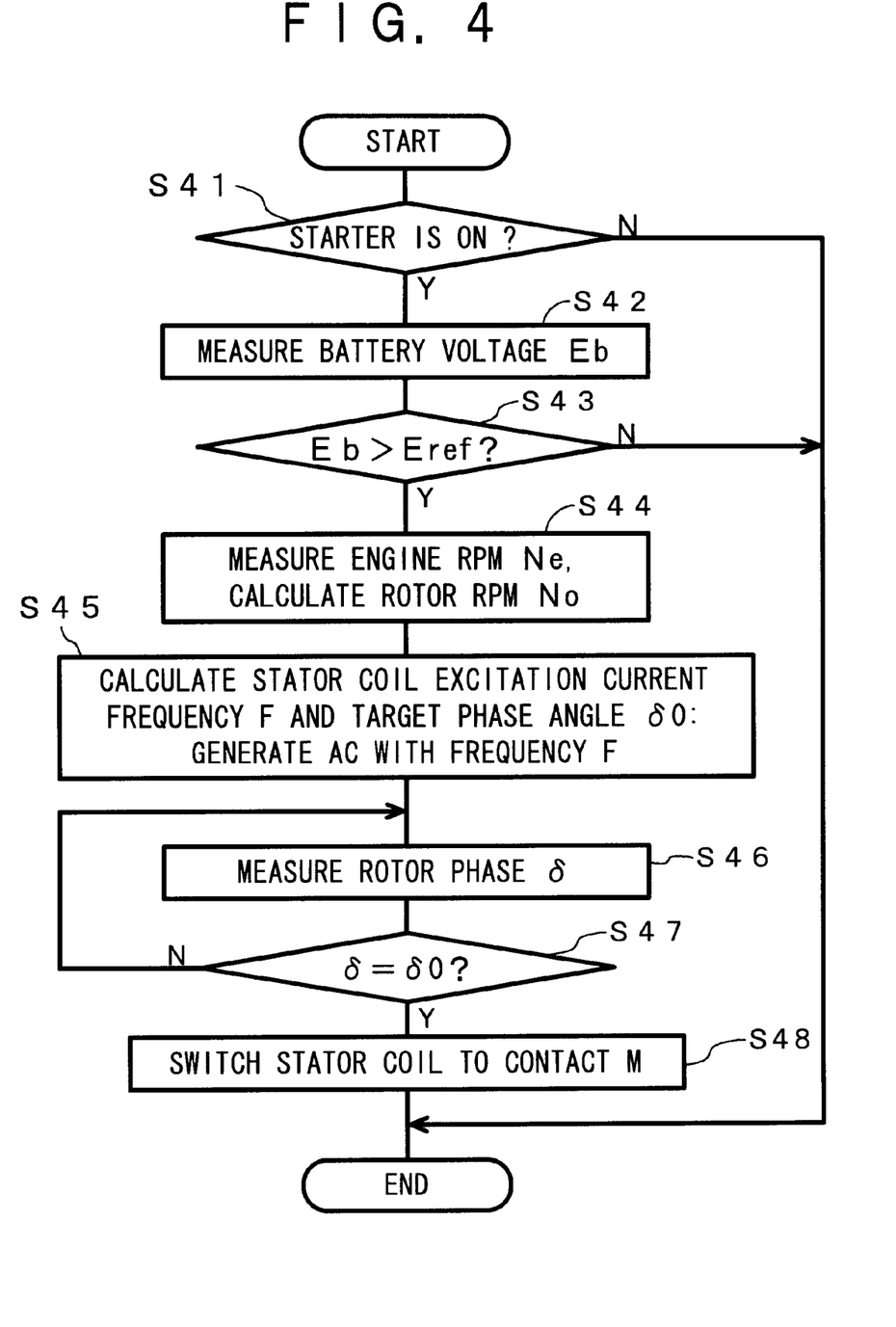
FIG. 4 is a flowchart showing operation according to another embodiment of the present invention.

FIG. 4 is a flowchart showing the control process according to another embodiment of the present invention, in which the alternator is set in the motor mode when starting the engine. In step S41, judgment is made as to whether or not the cel-motor is energized. If energized, the voltage Eb at the terminal of the battery 9 is measured in step S42. Then, in step S43, the measured battery voltage Eb is compared with the reference voltage Eref in the same manner as in the step S32 in FIG. 3. When the battery voltage Eb exceeds the reference voltage Eref, the procedure advances to step S44; when it is equal to or less than the reference voltage Eref, this process is ended.

As is similar to the steps S33 through 37 in FIG. 3, operations from steps S44 to S48 are executed one by one, such as measurement of the engine speed Ne, calculation of the current rotating speed N0 of the rotor, calculation of the frequency f of an excitation power source for the stator coils and the target phase angle δ , generation of alternating current at the frequency f, measurement of the rotor phase angle δ, comparison of the rotor phase angle δ with the target phase angle δ0, and switching over the stator coils 12 from the terminals G on the output controller side to the contacts M on the side of the rotating magnetic field generator 8. Steps S42 and S43 may be omitted so that the engine will be assisted each time the engine is started, regardless of the magnitude of the battery voltage Eb.

Figure 5:
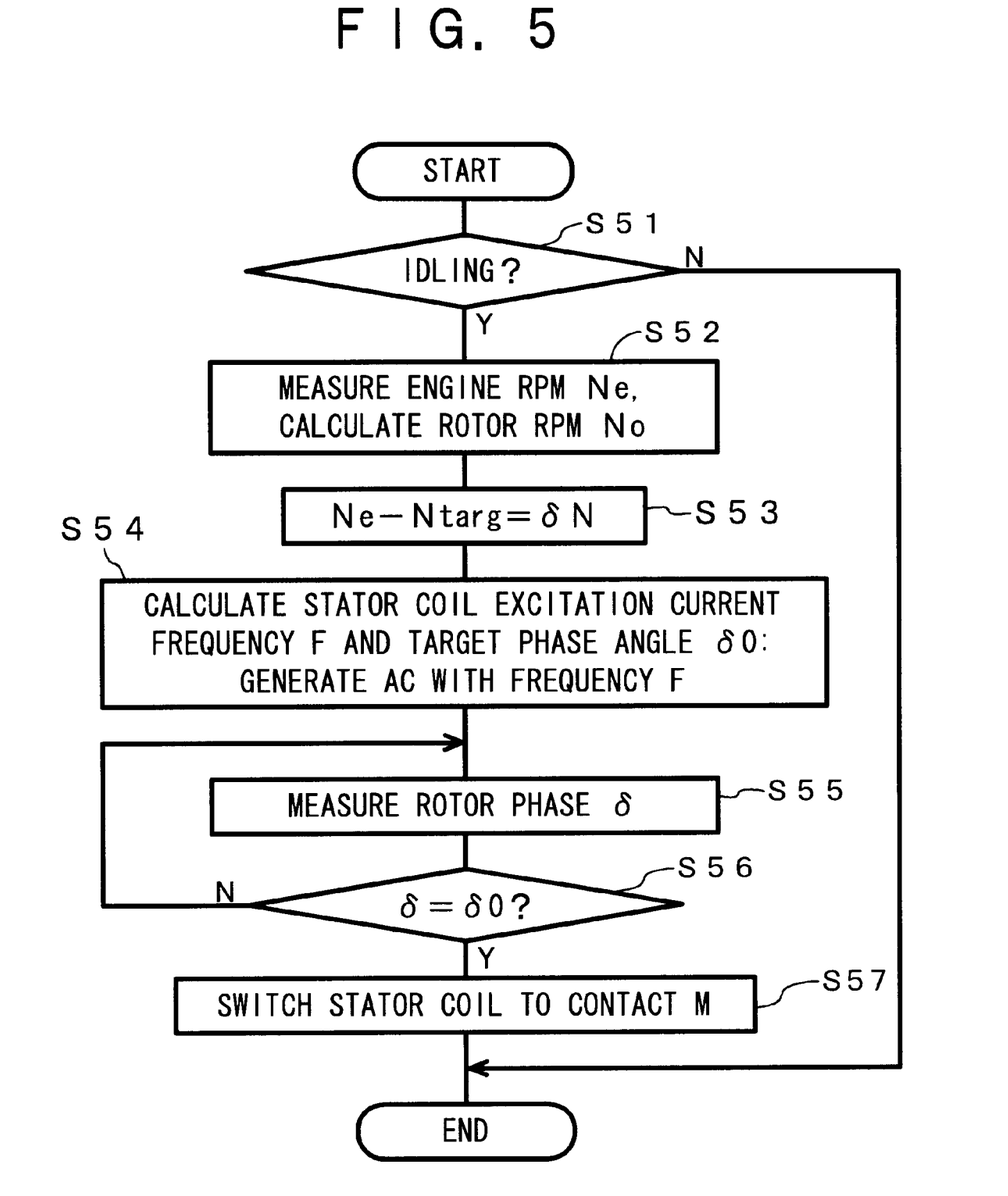
FIG. 5 is a flowchart showing operation according to still another embodiment of the present invention.

Referring next to a flowchart of FIG. 5, still another embodiment of the present invention will be described. In this process, the alternator 1 is made active as a motor so that the engine speed can be stabilized during idling.

When an idling condition of the engine is detected in step S51 in a proper manner known in the art, the engine speed Ne is measured to calculate the rotating speed N0 of the rotor in step S52. Then, in step S53, a deviation δN of the engine speed Ne from a target idling speed Ntarg is calculated. After that, operations from steps S54 to S57 are executed one by one, as is similar to the above-mentioned steps S34 through S37, such as calculation of the frequency f of the excitation power source for the stator coils and the target phase angle δ0. generation of alternating current at the frequency f, measurement of the rotor phase angle δ, comparison of the rotor phase angle δ with the target phase angle δ and switching over the stator coils 12 from the contacts G on the output controller side to the contacts M on the side of the rotating magnetic field generator.

As discussed above, when the rotating magnetic field generated in the stator 1S shows a leading phase to the direct-current magnetic field of the rotor 1R (i.e., the phase angle δ is positive), the alternator 1 in the motor mode generates such a torque as to assist the rotation of the engine; when it is a lagging phase (i.e., the phase angle δ is negative), it generates such a torque as to suppress the rotation of the engine.

When the engine speed Ne is less than the target rotating speed Ntarg and the deviation δN is negative, the target phase angle δ0 is set to a positive value in step S54 so that the alternator 1 will generate a torque for assisting the rotation of the engine. Conversely, when the engine speed Ne exceeds the target rotating speed Ntarg and the deviation δN is positive, the target phase angle δ0 is set to a negative value in step S54 so that the alternator 1 will generate a torque for suppressing the rotation of the engine.

Figure 6:
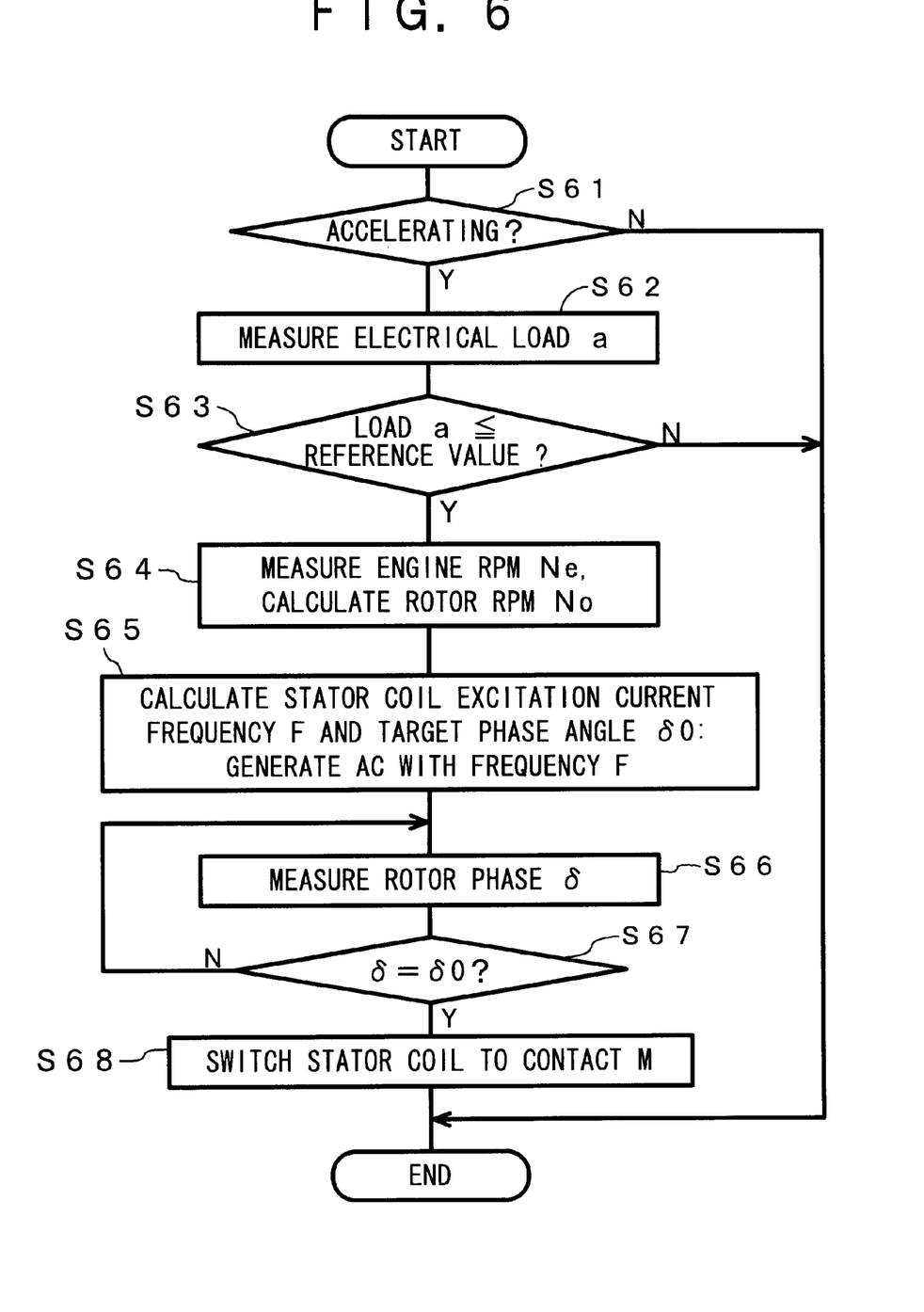
FIG. 6 is a flowchart showing operation according to yet another embodiment of the present invention.

Referring next to a flowchart of FIG. 6, yet another embodiment of the present invention will be described. In this process, the alternator 1 is set in the motor mode to assist the engine torque so as to improve acceleration performance.

In step S61, the acceleration judgment part 42 of the engine ECU 4 judges whether or not the vehicle is accelerating. The judgment is made, for example, based on the increase rate of the vehicle speed or the throttle position θth. If the vehicle is accelerating, a current electrical load a is measured in step S62. Then, in step S63, judgment is made as to whether or not the electrical load a is equal to or less than a reference value. If the electrical load a exceeds the reference value, the process is ended without applying any torque for assisting acceleration because interruption of the power generation is unfavorable. On the other hand, if the electrical load a is equal to or less than the reference value, the acceleration is assisted with a torque generated in the rotor 1R through the following steps.

That is, operations from steps S64 to S68 are executed one by one, as is similar to steps S33 through S37 in FIG. 3, such as measurement of the engine speed Ne, calculation of the rotating speed N0 of the rotor, calculation of the frequency f and the phase angle δ0 of the excitation power source for the stator coils, generation of alternating current at the frequency f, measurement of the rotor phase angle δ, comparison of the rotor phase angle δ with the target phase angle δ0, and switching over the stator coils 12 from the terminals G on the output controller side to the contacts M on the side of the rotating magnetic field generator 8. In this case, the target phase angle δ0 is, of course, positive.

When the alternator 1 is operated in the motor mode, the torque does not always assist the rotation of the engine as in the above embodiments. For example, if such a torque as to suppress the rotation of the engine is generated upon braking operation of an engine brake, the alternator 1 acts as a load to improve the braking performance. In such a control process, the content of judgment in the above step S61 of FIG. 6 has only to be changed to "being in a braking condition or not", so that illustration and description of the process are omitted here. Here, it should be noted that the target phase angle δ0 is set negative for suppressing the rotation of the engine.

The process of controlling the alternator 1 to produce such a negative torque as to suppress the rotation of the engine can also be applied to traction control (TSC) conventionally carried out when a wheel spin (slipping condition of drive wheels) of the vehicle is detected. As can easily be found from the above description, this control process requires only to change the content of judgment of the above step S61 of FIG. 6 to "whether or not traction control (TSC) is instructed".

Specifically, when the wheel spin detection part 44 of the engine ECU 4 detects the wheel spin, judgment is made first as to whether or not traction control (TSC) is instructed. If the judgment result is Yes, subsequent steps S62 to S68 are executed. In this case, the target phase angle δ0 is set negative too, and the value thereof may be determined experientially and/or experimentally according to the degree of the wheel spin. This makes it possible to carry out traction control in quicker response than that in such a conventional control system as to decrease the engine torque by interrupting the fuel supply or the like. The suppression of the engine torque according to the present invention may be used together with such a conventional control system as to decrease the engine torque by interrupting the fuel supply or the like.

Figure 7:
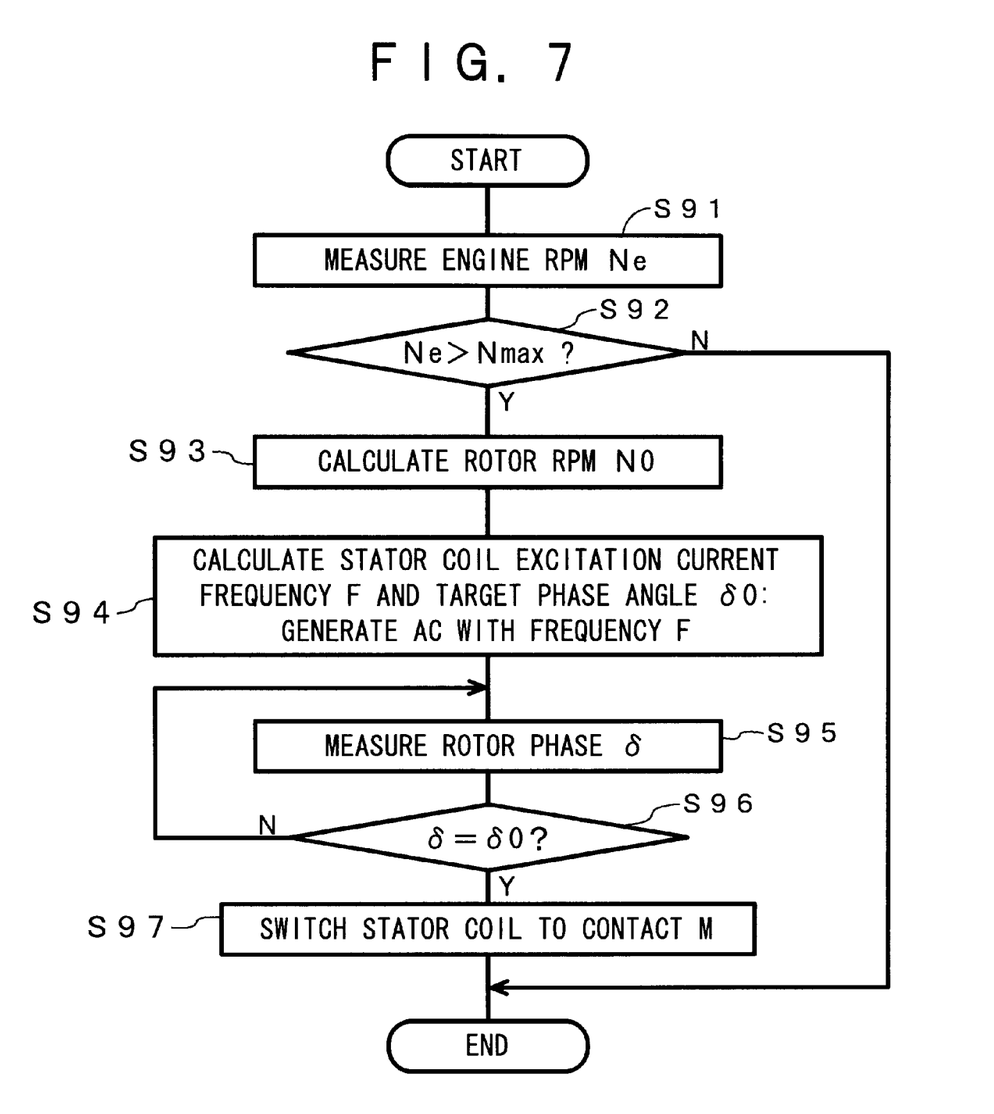
FIG. 7 is a flowchart showing operation according to yet another embodiment of the present invention.

FIG. 7 is a flowchart showing the control process according to yet another embodiment of the present invention, in which when the engine speed is close to or exceeds a maximum limit, the alternator 1 is switched into the motor mode to generate such a suppressing torque as to reduce the rotation of the engine, whereby over revolution of the engine is prevented.

The engine speed Ne is measured in step S91, and the measured engine speed Ne is compared with a maximum engine speed Nmax in step S92. If it is judged that the engine speed Ne reaches the maximum engine speed Nmax, a rotating speed N0 of the rotor at that time is calculated as a function of the engine speed Ne. After that, operations from steps S94 to S97 are executed one by one, as is similar to the above steps S34 through S37, such as calculation of the frequency f and the phase angle δ0 of the excitation power source for the stator coils, generation of alternating current at the frequency f, measurement of the rotor phase angle δ, comparison of the rotor phase angle δ with the target phase angle δ0, and switching over the stator coils 12 from the terminals G on the output controller side to the contacts M on the side of the rotating magnetic field generator 8. In this case, the target phase angle δ0 is, of course, negative. On the other hand, if the judgment result at step S92 is No, the above operations S93–S97 are not executed.

Figure 8:
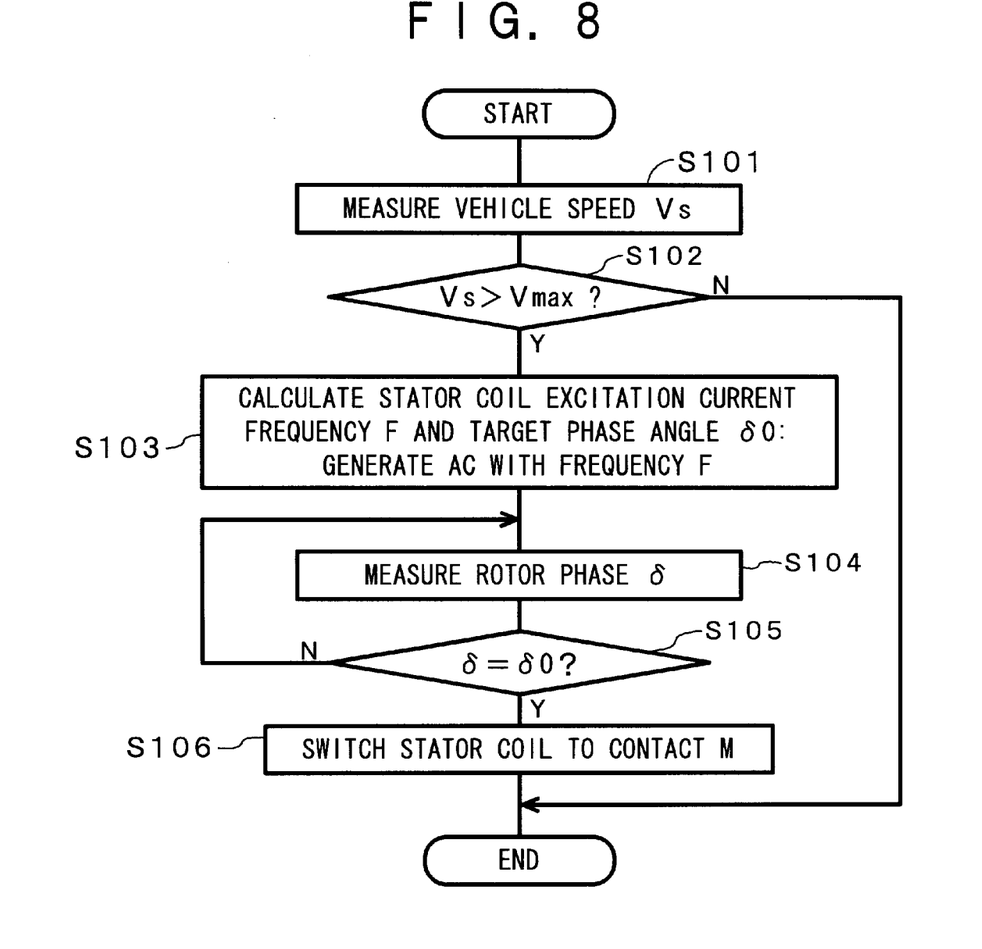
FIG. 8 is a flowchart showing operation according to yet another embodiment of the present invention.

FIG. 8 is a flowchart showing the control process according to yet another embodiment of the present invention, in which when the crusing speed of the vehicle or the like with the internal combustion engine mounted thereon is close to or exceeds a maximum limit, the alternator 1 is switched into the motor mode to generate such a suppressing torque as to reduce the rotation of the engine, whereby a vehicle speed limiting function is realized.

In step S101, the vehicle speed measurement part 45 of the ECU 4 measures a current vehicle speed Vs. The measured vehicle speed Vs is compared with a maximum speed Vmax in step S102. If it is judged that the vehicle speed Vs reaches or is over the maximum speed Vmax, then operations from steps S103 to S106 are executed one by one, as is similar to the above steps S34 through S37, such as calculation of the frequency f and the target phase angle δ0 of the excitation power source for the stator coils, generation of alternating current at the frequency f, measurement of the rotor phase angle δ, comparison of the rotor phase angle δ with the target phase angle δ0, and switching over the stator coils 12 from the terminals G on the output controller side to the contacts M on the side of the rotating magnetic field generator 8. In this case, the target phase angle δ0 is, of course, negative. On the other hand, if the judgment result at step S102 is No, the above operations S103–S106 are not executed.

In the above embodiments, although a step of determining a battery voltage or electrical load is not included in some cases, such a determination step may be adopted in said cares. In the case such a step is adopted, the switching into the motor mode may be inhibited when the battery voltage is equal to or less than a predetermined reference value, or when the electric load exceeds a predetermined reference value. Further, if the magnitude of such a torque as to assist or suppress the engine reaches a target value at the beginning of switching the contacts from the G side to the M side, it may disturb the engine. It is therefore desirable to control the torque such that the amplitude of alternating current to be supplied to the stator coils 12 is small enough to set the generated torque to substantial zero or small enough just after the switching action, and thereafter increases gradually with time. Furthermore, in the above embodiments, the alternator includes a stator with three-phase windings, but the present invention is not limited thereto, and any other multi-phase windings such as of four-phase or five-phase can be adopted instead.

INDUSTRIAL APPLICABILITY

The following advantages are achieved by the present invention.

(1) Conventionally used or existing alternators of direct-current magnetization type or permanent magnet type can also be operated as a synchronous motor to generate such a torque as to assist or suppress the rotation of the engine.

(2) Generation of such a torque as to compensate for variation in rotation of an internal combustion engine reduces the fluctuation in engine speed during the idling of the engine, resulting in stable engine operation.

(3) If the torque assisting the rotation of the internal combustion engine is generated when power generation by the alternator is no longer necessary, it is possible to cancel rotation loss due to belt driving torque and cooling fan resistance, and hence improve engine efficiency.

(4) When the torque assisting the rotation of the internal combustion engine is generated at the time of starting the internal combustion engine, it is possible to help the cel-motor with such an assisting torque, and hence to start the engine quickly and surely, and furthermore to realize the miniaturization of the cel-motor.

(5) When the torque assisting the rotation of the internal combustion engine is generated in an acceleration condition of the vehicle, it is possible to improve acceleration performance.

(6) When the torque suppressing the rotation of the internal combustion engine is generated in a braking condition of the vehicle, it is possible to improve braking performance.

(7) If the torque suppressing the rotation of the internal combustion engine is generated when the wheel spin of the vehicle is detected, it is possible to improve responsive performance of the traction control.

(8) If the torque suppressing the rotation of the internal combustion engine is generated when the rotating speed of the internal combustion engine or the speed of the vehicle and the like with the internal combustion engine mounted thereon, is likely to exceed a maximum limit, it is possible to prevent over revolution of the internal combustion engine, or overspeed of the vehicle.

What is claimed is:

1. A generator-motor for internal combustion engines comprising:
    an alternator which includes a stator having multi-phase windings and a rotor having direct-current magnetic field generation means, with the rotor mechanically coupled to a rotating shaft of an internal combustion engine, the alternator initially operating in a generator mode and being capable of operating selectively in a motor mode;
    output control means, when said alternator is in the generator mode, for converting an alternating current generated in the multi-phase windings of said stator by the rotation of said rotor resulting from the rotation of the internal combustion engine, into direct current;
    rotating magnetic-field speed decision means for deciding a frequency of excitation current to be supplied to the multi-phase windings of said stator as a function of an engine rotation speed so that the multi-phase windings of said stator generates a rotating magnetic field at a rotating speed equal to that of said rotor;
    rotating magnetic field generation means, when said alternator is in the motor mode, for generating an alternating current at the frequency decided by said rotating magnetic-field speed decision means;
    switching means for selectively connecting the multi-phase windings of said stator to one of said output control means and said rotating magnetic field generation means; and
    switching control means for controlling said switching means based on the operating condition of said internal combustion engine to selectively connect the multi-windings of said stator to said output control means in the generator mode, and said rotating magnetic field generation means in the motor mode.

2. A generator-motor for internal combustion engines according to claim 1, wherein said rotor is provide with a rotor winding to which direct current is supplied for generating the direct current magnetic field.

3. A generator-motor for internal combustion engines according to claim 1, wherein said rotating magnetic-field speed decision means also decides a phase angle of the rotating magnetic field with respect to a direct-current magnetic field of said rotor so that said alternator in the motor mode generates such a torque as to absorb fluctuations in rotation of the internal combustion engine for stabilization of its rotating speed.

4. A generator-motor for internal combustion engines according to claim 3, wherein said rotating magnetic-field speed decision means further decides the magnitude of excitation current flowing through the multi-phase windings of said stator.

5. A generator-motor for internal combustion engines according to claim 1, wherein when power generation by said alternator is no longer necessary depending on a charged state of a battery, said switching means connects the multi-phase windings of said stator to said rotating magnetic field generation means, and said rotating magnetic-field speed decision means further decides a phase angle of said rotating magnetic field with respect to a direct-current magnetic field of said rotor so that said alternator in the motor mode generates such a torque as to assist the rotation of the internal combustion engine.

6. A generator-motor for internal combustion engines according to claim 5, wherein said alternator is inhibited from being set in the motor mode when a terminal voltage of the battery is equal to or less than a predetermined reference value.

7. A generator-motor for internal combustion engines according to claim 5, wherein said rotating magnetic-field speed decision means further decides the magnitude of excitation current flowing through the multi-phase windings of said stator.

8. A generator-motor for internal combustion engines according to claim 1, wherein when a starter motor for the internal combustion engine is energized, said switching means connects the multi-phase windings of said stator to said rotating magnetic field generation means, and said rotating magnetic-field speed decision means further decides a phase angle of said rotating magnetic field with respect to a direct-current magnetic field of said rotor so that said alternator in the motor mode generates such a torque as to assist the rotation of the internal combustion engine.

9. A generator-motor for internal combustion engines according to claim 1, wherein when the rotating speed of the internal combustion engine is likely to exceed a predetermined maximum limit, said switching means connects the multi-phase windings of said stator to said rotating magnetic field generation means, and said rotating magnetic-field speed decision means further decides a phase angle of said rotating magnetic field with respect to a direct-current magnetic field of said rotor so that said alternator in the motor mode generates such a suppressing torque as to inhibit the rotation speed of the internal combustion engine from exceeding the maximum limit.

10. A generator-motor for internal combustion engines according to claim 1, further comprising;
   means for judging that a vehicle with the internal combustion engine mounted thereon is being accelerated and
   means for measuring an electrical load on said vehicle,
   wherein when an acceleration condition of the vehicle is judged, said switching means connects the multi-phase windings of said stator to said rotating magnetic field generation means said rotating magnetic-field speed decision means further decides a phase angle of said rotating magnetic field with respect to a direct-current magnetic field of said rotor so that said alternator in the motor mode generates such a torque as to assist the rotation of the internal combustion engine, and
   wherein said alternator is set in the motor mode only when the electrical load is less than a predetermined reference value.

11. A generator-motor for internal combustion engines according to claim 1, further comprising means for judging that a vehicle with the internal combustion engine mounted thereon is being braked,
   wherein when a braking condition of the vehicle is judged, said switching means connects the multi-phase windings of said stator to said rotating magnetic field generation means, and
   wherein said rotating magnetic-field speed decision means further decides a phase angle of said rotating magnetic field with respect to a direct-current magnetic field of said rotor so that said alternator in the motor mode generates such a torque as to suppress the rotation of the internal combustion engine.

12. A generator-motor for internal combustion engines according to claim 11, further comprising means for measuring electrical load on said vehicle,
   wherein said alternator is set in the motor mode only when the electrical load is less than a predetermined reference value.

13. A generator-motor for internal combustion engines according to claim 1, further comprising means for detecting a wheel spin of a vehicle with said generator-motor mounted thereon, wherein when the wheel spin is detected, said switching means connects the multi-phase windings of said stator to said rotating magnetic field generation means, and
   said rotating magnetic-field speed decision means further decides a phase angle of said rotating magnetic field with respect to a direct-current magnetic field of said rotor so that said alternator in the motor mode generates such a torque as to suppress the rotation of the internal combustion engine.

14. A generator-motor for internal combustion engines according to claim 13, further comprising means for measuring electrical load on said vehicle, wherein said alternator is set in the motor mode only when the electrical load is less than a predetermined reference value.

15. A generator-motor for internal combustion engines according to claim 1, further comprising means for detecting speed of a vehicle with said generator-motor mounted thereon,
   wherein when the vehicle speed is likely to exceed a predetermined maximum limit, said switching means connects the multi-phase windings of said stator to said rotating magnetic field generation means, and
   wherein said rotating magnetic-field speed decision means further decides a phase angle of said rotating magnetic field with respect to a direct-current magnetic field of said rotor so that said alternator in the motor mode generates such a torque as to suppress the rotation of the internal combustion engine.

16. A generator-motor for internal combustion engines according to claim 15, further comprising means for measuring electrical load on said vehicle,
   wherein said alternator is set in the motor mode only when the electrical load is less than a predetermined reference value.

* * * * *